United States Patent
Killebrew et al.

(10) Patent No.: US 6,296,970 B1
(45) Date of Patent: Oct. 2, 2001

(54) CONNECTOR ASSEMBLY FOR CONNECTING BATTERY CELLS

(75) Inventors: Daniel Killebrew, Lake City; Martin C. Orler, Gainesville; Thomas F. Shea, Gainesville; James R. Brown, Gainesville; Harvey C. Hilderbrand, Gainesville; Vincent Puglisi, Gainesville; David L. DeVries, Gainesville, all of FL (US)

(73) Assignee: Moltech Power Systems, Inc., Gainesville, FL (US)

( * ) Notice: Subject to any disclaimer, the term of this patent is extended or adjusted under 35 U.S.C. 154(b) by 0 days.

(21) Appl. No.: 09/489,275

(22) Filed: Jan. 21, 2000

(51) Int. Cl.⁷ ............ H01M 2/20; H01M 2/24; H01M 2/30; H01M 2/26
(52) U.S. Cl. ............ 429/158; 429/160; 429/159; 429/170; 429/178; 439/500
(58) Field of Search ................ 429/158, 160, 429/159, 170, 178; 439/500

(56) References Cited

U.S. PATENT DOCUMENTS

| | | | |
|---|---|---|---|
| 3,615,867 | 10/1971 | Cich et al. | 136/175 |
| 3,923,549 | 12/1975 | Mabuchi et al. | 136/134 |
| 4,873,160 | * 10/1989 | Miyazaki et al. | 429/170 |
| 5,578,392 | 11/1996 | Kawamura | 429/99 |
| 5,659,946 | 8/1997 | Harima et al. | 29/623.4 |
| 5,900,332 | 5/1999 | Marukawa et al. | 429/158 |
| 5,985,480 | 11/1999 | Sato et al. | 429/65 |
| 6,224,997 | * 5/2001 | Papadopoulos | 429/99 |

FOREIGN PATENT DOCUMENTS

| | | |
|---|---|---|
| 0717453 | 6/1996 | (EP). |
| 0771038 | 5/1997 | (EP). |
| 59224055 | 12/1984 | (JP). |
| 59224056 | 12/1984 | (JP). |
| 63105460 | 10/1988 | (JP). |

OTHER PUBLICATIONS

Photograph #1: Battery sticks, 1998 Toyota Prius No month.
Photograph #2: Opposing battery stick terminals, 1998 Toyota Prius No month.
Photograph #3: Opposing battery stick terminals, 1998 Toyota Prius No month.
Photograph #4: Battery stick, 1998 Toyota Prius No month.
Photograph #5: Battery stick, 1998 Toyota Prius No month.
Photograph #6: Positive end of battery stick, 1998 Toyota Prius No month.
Photograph #7: Negative end of battery stick, 1998 Toyota Prius No month.

* cited by examiner

Primary Examiner—Gabrielle Brouillette
Assistant Examiner—Tracy Dove

(57) ABSTRACT

A connector assembly connects a plurality of battery cells in a serial/parallel arrangement. Each battery cell includes a cover and a canister having a side and a bottom. Each battery cell is constructed such that a segment of the side of the canister forms a top crimped portion that retains the cover and is electrically isolated from the cover. The connector assembly includes a conductive weld cup. The conductive weld cup includes a bordered portion and recessed portion. The bordered portion includes a first side wall and a ledge that is substantially planar. The recessed portion is recessed within the ledge. The recessed portion includes a recessed portion and a floor that is substantially planar. The first side wall includes an integrated tab projecting from it. An inner surface of the bordered portion engages an outer surface of the side and the bottom of the canister of an upper adjacent battery cell. An outer surface of the floor engages a cover of a lower adjacent battery cell. The integrated tab provides for coupling the battery cells of two adjacent battery sticks in parallel.

27 Claims, 4 Drawing Sheets

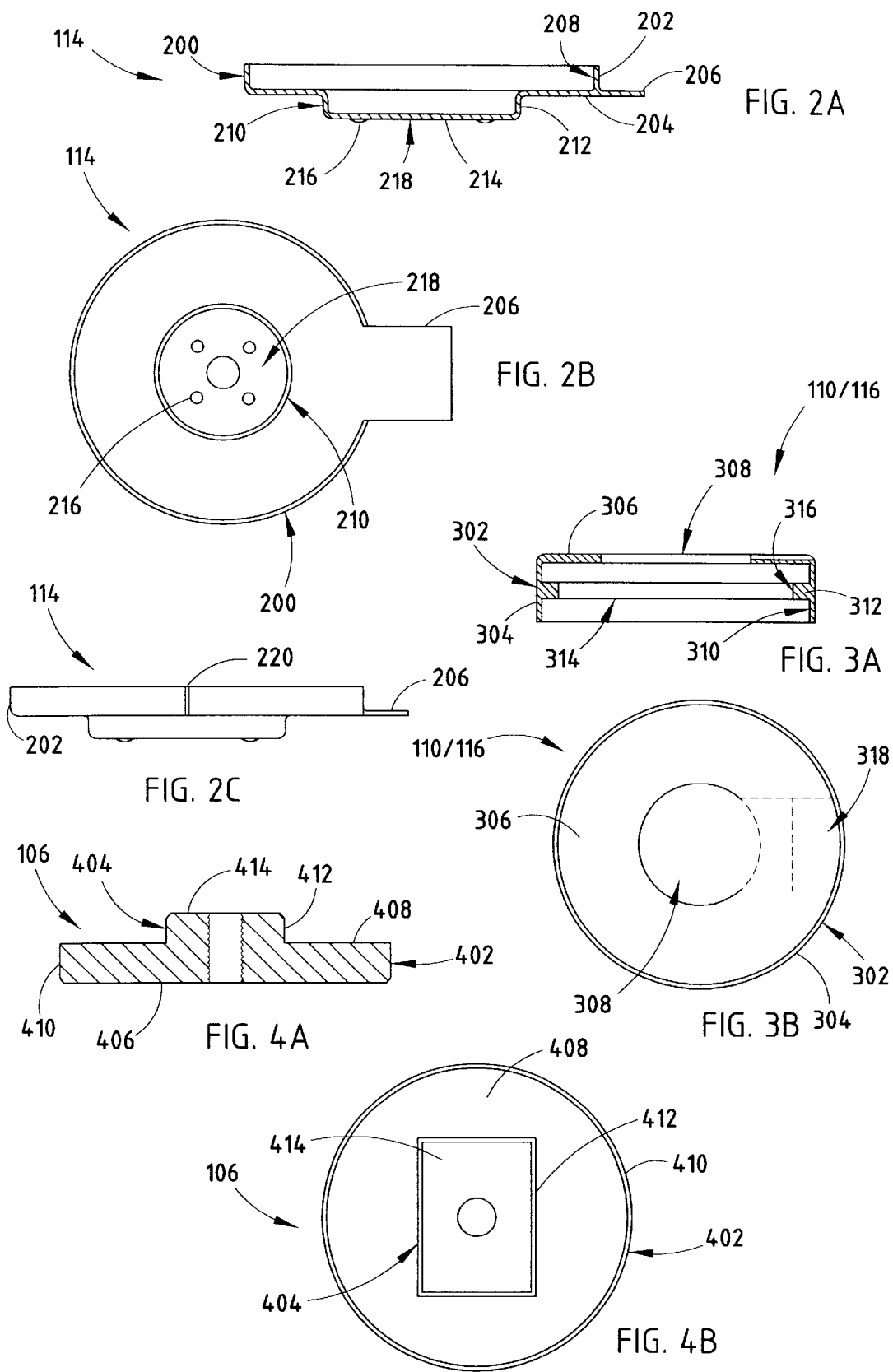

CONNECTOR ASSEMBLY FOR CONNECTING BATTERY CELLS

BACKGROUND OF THE INVENTION

The present invention is directed to a connector assembly and more specifically to a connector assembly for connecting a plurality of battery cells in a battery pack.

Rechargeable cylindrical battery cells have been widely employed as a power source for various portable apparatus. These battery cells have included nickel cadmium and nickel metal hydride cells. In a typical battery pack, a plurality of battery cells are retained in an end-to-end configuration to form a battery stick. Some battery packs include multiple battery sticks connected in a serial/parallel manner. U.S. Pat. No. 5,578,392 entitled "CYLINDRICAL CELL, A CELL PACK, AND A CELL HOLDER," discloses a terminal made of an electrically conductive material that included a face portion having either a female threaded hole or a male threaded protrusion. The terminal included legs, which were welded to an end of a battery cell. A conductive connecting member was then utilized to connect multiple cells in a serial/parallel arrangement.

U.S. Pat. No. 5,900,332 entitled "CONNECTION STRUCTURE FOR JOINING BATTERIES," discloses a connector for connecting battery cells of a battery pack in series. The connector was welded to a face (positive terminal) of one battery cell and welded to the side (negative terminal) of a second battery cell. In this manner, two battery cells were coupled in series. In addition, U.S. Pat. No. 5,900,332 also discloses a connector with a slit in a side wall of the connector. The slit functioned to provide an elastic force to a side of the cylindrical battery cell when the cell engaged the connector. The disclosed connector also included a plurality of first projections on a second flat portion of the connector and a plurality of second projections located on an inside surface of a side wall of the connector.

SUMMARY OF THE INVENTION

An embodiment of the present invention is directed to a connector assembly for connecting a plurality of battery cells in a serial/parallel arrangement. The connector assembly includes a conductive weld cup. The conductive weld cup includes a bordered portion and recessed portion. The bordered portion has a first side wall, a ledge, and an integrated tab projecting from the first side wall. The ledge and the integrated tab are disposed at an angle to the first side wall. The recessed portion is recessed within the ledge. The recessed portion includes a second side wall and a floor that is bounded by the second side wall. An inner surface of the bordered portion engages an outer surface of a side and a bottom of a canister of an upper adjacent battery cell. An outer surface of the floor engages a cover of a lower adjacent battery cell. The integrated tab is provided for coupling the battery cells of two adjacent battery sticks in parallel.

These and other features, advantages and objects of the present invention will be further understood and appreciated by those skilled in the art by reference to the following specification, claims, and appended drawings.

BRIEF DESCRIPTION OF THE DRAWINGS

In the drawings:

FIG. 2A is cross-sectional view of a conductive weld cup that includes an integrated tab, according to an embodiment of the present invention;

FIG. 2B is a bottom view of the cup of FIG. 2A;

FIG. 2C is a side view of the cup of FIG. 2A that includes a slot;

FIG. 3A is cross-sectional view of an insulative cup, according to an embodiment of the present invention;

FIG. 3B is a top view of the insulative cup of FIG. 3A;

FIG. 4A is cross-sectional view of a conductive battery stick terminal end connector, according to an embodiment of the present invention;

FIG. 4B is top view of the connector of FIG. 4A;

DETAILED DESCRIPTION OF PREFERRED EMBODIMENTS

For purposes of description herein, the terms "upper," "lower," "right," "left," "rear," "front," "vertical," "horizontal," "top," "bottom," and derivatives thereof shall relate to the invention as depicted in the figures contained herein. However, it is to be understood that the invention may assume various alternative orientations, except where expressly specified to the contrary. It is also to be understood that the specific device illustrated in the attached drawings and described in the following specification is simply an exemplary embodiment of the inventive concepts defined in the appended claims. Hence, specific dimensions, proportions, and other physical characteristics relating to the embodiment disclosed herein are not to be considered as limiting, unless the claims expressly state otherwise.

Various connectors, as described in the background, have been used to couple a plurality of battery cells. A connector assembly, according to the present invention, allows a plurality of battery cells of a battery stick to be coupled in both a serial and a parallel manner. This is facilitated by an integrated tab, which projects from a side wall of a conductive weld cup. In the following discussion, a battery stick refers to a plurality of battery cells coupled in series. A battery stack refers to a plurality of battery sticks coupled in parallel.

Another embodiment of the present invention is directed toward a battery stick terminal end connector assembly that allows a plurality of battery sticks to be readily coupled with an end conductive strap. This facilitates easier assembly during manufacturing. According to another embodiment, an insulative cup is provided that prevents opposite polarity terminals of a same battery cell from being shorted together. As described herein, battery cells coupled with the disclosed connector assembly include a cover and a canister having a side and a bottom. A segment of the side of the canister forms a top crimped portion (or bead) that retains the cover and is electrically isolated from the cover. The canister is typically cylindrical with a closed end forming the bottom and an open end in which the cover is secured. However, one skilled in the art will appreciate that the present connection assembly can be readily modified to function with non-cylindrical battery cells of a similar construction.

Figure 1A:
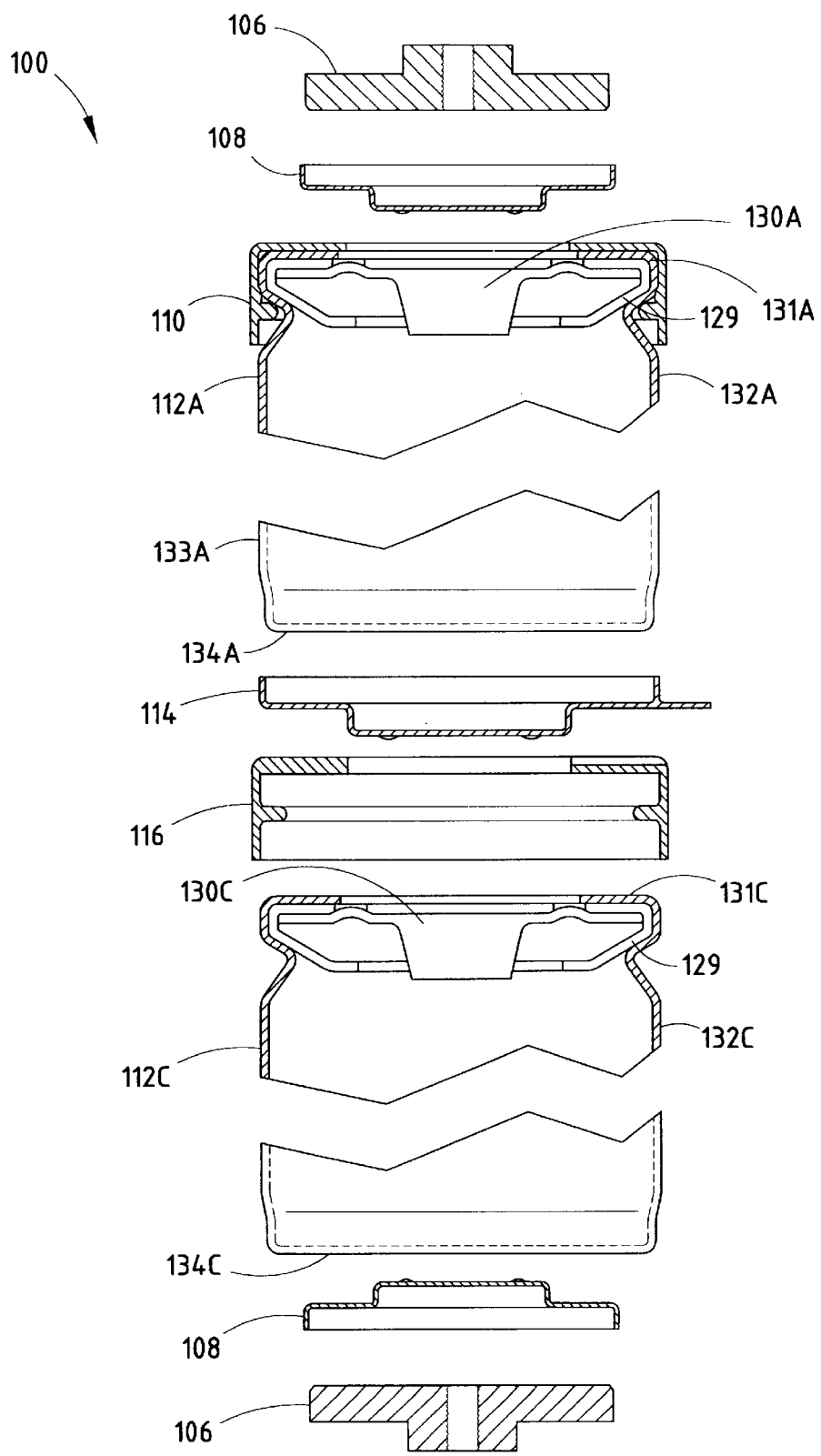
FIG. 1A is a cross-sectional view of a plurality of battery cells joined by connectors to form a battery stick, according to an embodiment of the present invention.

FIG. 1A is a cross-sectional view of a battery stick 100 incorporating a connector assembly according to an embodiment of the present invention. Battery stick 100 includes a conductive weld cup 114 that is used to physically join battery cells 112A and 112C. Battery cells 112A and 112C include a gasket 129 to provide electrical insulation between the cell cover and the cell can. To prevent the possible shorting of a top crimped portion 131C of cell 112C to a cover 130C through weld cup 114, an insulative cup 116 can be utilized between weld cup 114 and battery cell 112C. During assembly, weld cup 114 is welded to cover 130C of battery cell 112C. Then, battery cell 112A is inserted into weld cup 114. Weld cup 114 is then welded to a side 133A of battery cell 112A around a periphery of weld cup 114. While only two battery cells 112A and 112C are shown coupled serially in battery stick 100, one of skill in the art will appreciate that any number of such battery cells could be coupled utilizing additional weld cups 114.

At both ends of battery stick 100, a conductive terminal end cup 108 is utilized. A first end cup 108 is spot welded to a cover 130A of battery cell 112A. A second end cup 108 is welded to a bottom 134C of battery cell 112C. While second end cup 108, as shown in FIGS. 1A–B and FIGS. 5A–C, includes a recessed portion, it is contemplated that the recessed portion can be removed and a ledge of a bordered portion can be extended when second end cup 108 is coupled to a bottom of a canister of a lower end battery cell. As shown, an insulative cup 110 is located between battery cell 112A and first end cup 108, before welding. As previously discussed in reference to insulative cup 116 and cell 112C, insulative cup 110, similar to insulative cup 116, prevents a top crimped portion 13 1A of battery cell 112A from being shorted to a cover 130A of battery cell 112A through first end cup 108. Depending on the configuration of cell 112A, insulative cup 110 may not be necessary to prevent shorting between the cell terminals of opposing polarity.

Figure 1B:
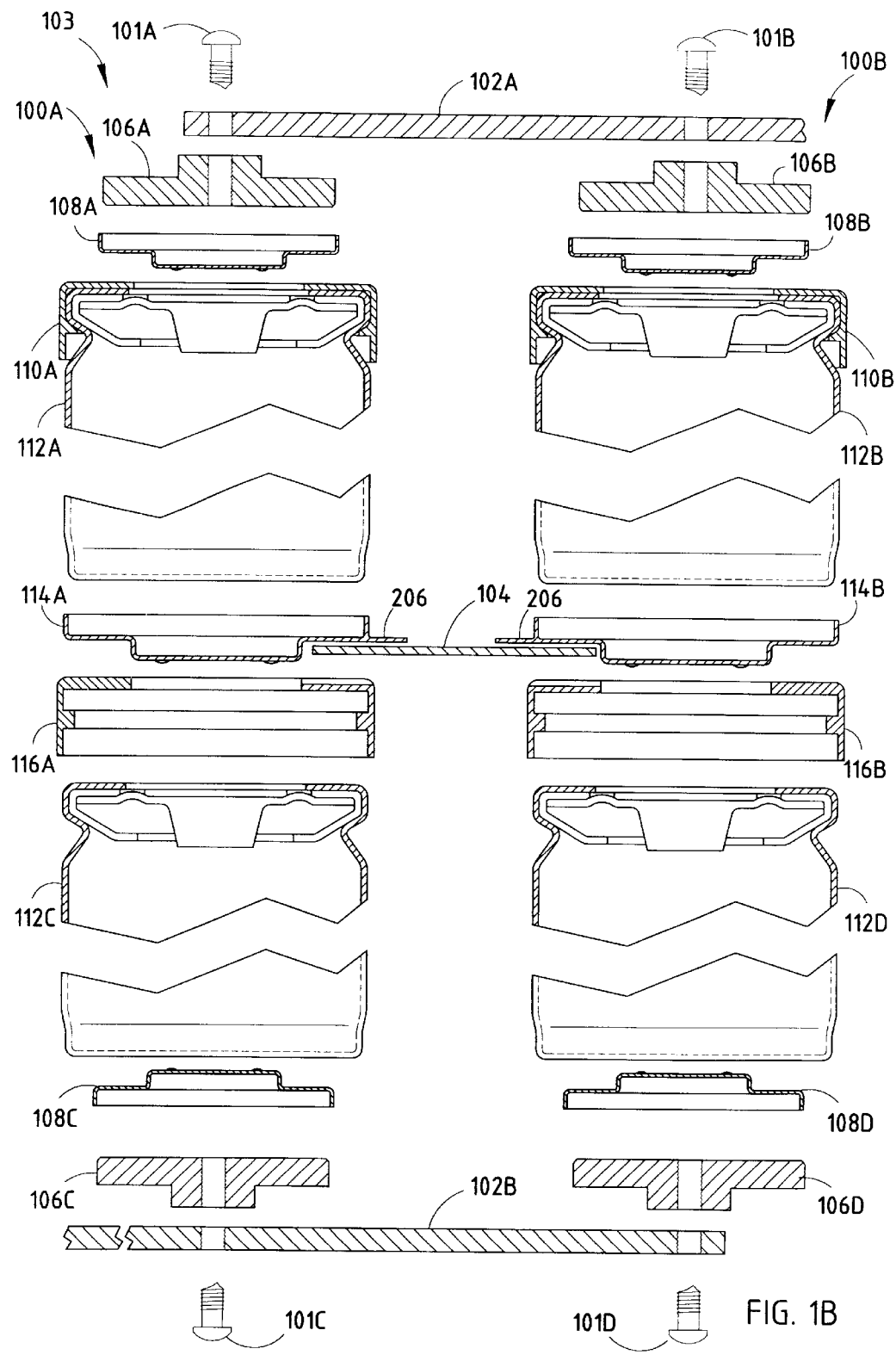
FIG. 1B is a cross-sectional view of two battery sticks (according to FIG. 1A) forming a battery stack.

A pair of conductive battery stick terminal end connectors 106 are received by first end cup 108 and second end cup 108 at both ends of battery stick 100. End cup 108 and connector 106 (in combination) provide a high current battery stick terminal. This terminal allows multiple battery sticks to be readily coupled. This generally allows heavier conductive straps to be utilized than was previously implemented when battery sticks were joined through resistive welding techniques. In addition, a terminal end connector 106 of a single design can be utilized as terminals on both ends (positive and negative) of a battery stick when cells from one stick are also connected in parallel to cells from adjacent sticks, as shown in FIG. 1B. When sticks are configured in this manner, the polarity for the end of each stick is indicated by the orientation of the protrusion or other indicator on terminal end connector 106. Because one stick cannot be rotated with respect to the second stick in this configuration, it is not possible to defeat the objective of accurate polarity designation by rotating one stick by 90 degrees. With parallel connection between cells of adjacent sticks, terminal end connectors of a single design can be used on the ends of the stick, thereby avoiding the necessity and expense of designing different shaped terminal end connectors to distinguish between positive and negative terminals.

When cells from adjacent sticks are not connected in parallel, terminal end connectors 106 designed such that they uniquely identify the terminal polarity regardless of the orientation of the stick must be used to differentiate the positive and negative poles of the stick. It will be appreciated that this is necessary to prevent the rotation of one stick from resulting in the misidentification of the stick polarity.

Utilizing end cup 108 and connector 106 allows for configuring the battery sticks of a battery pack upon installation into a battery pack casing, rather than during welding. Additionally, standard mechanical fasteners can be used to connect the battery sticks of a battery pack. Connector 106 is retained in end cup 108 by spot welding around the periphery of end cup 108.

A cell of a battery stick can be joined in parallel with a cell of a distinct battery stick by an intermediate conductive strap 104 (see FIG. 1B) connected to integrated tab 206 or by directly connecting integrated tabs 206 from distinct sticks. Thus, integrated tab 206 and conductive strap 104 can be used independently or in combination to achieve a parallel connection between cells of adjacent sticks. This parallel configuration has been thought to be desirable for certain chemical battery families.

FIG. 1B illustrates two battery sticks 100A and 100B that are coupled to form a battery stack 103, according to an embodiment of the present invention. Battery sticks 100A and 100B are identical to battery stick 100 (of FIG. 1A) and as such, are not further discussed herein. While only two battery sticks 100A and 100B are shown coupled in parallel to form battery stack 103, one of skill in the art will appreciate that any number of such battery sticks could be coupled utilizing end conductive straps (such as end conductive straps 102A and 102B). End conductive straps 102A and 102B are preferably connected to battery sticks 100A and 100B with machine screws 101A, 101B, 101C and 101D. As previously mentioned, an intermediate conductive strap 104 is used to internally couple battery cells of battery sticks 100A and 100B in parallel.

FIG. 2A is a cross-sectional view of conductive weld cup 114. Weld cup 114 includes a bordered portion 200 and a recessed portion 210 that is recessed within bordered portion 200. Bordered portion 200 includes a first side wall 202 and a ledge 204 that is substantially planar. An integrated tab 206 projects from first side wall 202 and can be formed from a segment of first side wall 202 or initially manufactured as part of weld cup 114. One of skill in the art will appreciate that multiple integrated tabs 206 can be implemented to allow the battery cells of more than two battery sticks to be connected in parallel, if desired. One of skill in the art will also appreciate that the shape of the tab, including the width and gauge can be varied to accommodate an expected current flow.

Weld cup 114 essentially eliminates the need to insert an intermediate conductive strap into the battery stick and as such reduces the possibility of short circuits that can be created by such a process. As mentioned above, integrated tab 206 can be manufactured into weld cup 114 or weld cup 114 can be altered during assembly of a battery stick. In a preferred embodiment, ledge 204 and integrated tab 206 are substantially coplanar and orthogonal to first side wall 202. Recessed portion 210 includes a second side wall 212 and a floor 214 that is substantially planar. Second side wall 212 and floor 214 are recessed within ledge 204. Floor 214 is substantially orthogonal to second side wall 212. An inner surface 208 of bordered portion 200 engages an outer surface of the side and the bottom of the canister of an upper adjacent battery cell (e.g., battery cells 112A and 112B of FIG. 1B). An outer surface 218 of floor 214 engages the cover of a lower adjacent battery cell (e.g., battery cells 112C and 112D of FIG. 1B). Floor 214 may include a plurality of protrusions 216 for welding weld cup 114 to the cover of a lower adjacent battery cell.

FIG. 2B is a bottom view of weld cup 114. In FIG. 2B, four protrusions 216 are shown. FIG. 2C is a side view of weld cup 114 that shows an opening 220 in the shape of a slot that substantially transitions first side wall 202. Another slot (not shown) is preferably opposite opening 220. Opening 220 can alternatively transition only a portion of first side wall 202. One of skill in the art will appreciate that the number and shape of opening 220 can be varied to reach a desired result. The addition of a plurality of openings helps to improve the quality and consistency of a weld between a weld cup and a side of a battery cell. This, in turn, lowers the electrical resistance of the battery stick and improves the rigidity and reduces dimensional variations in the battery stick.

FIG. 3A is cross-sectional view of an insulative cup that includes features of both insulative cups 110 and 116. A difference between insulative cup 110 and insulative cup 116 is that insulative cup 110 is not fashioned with a receptacle to receive an intermediate conductive strap 104. If intermediate conductive straps 104 are not utilized, insulative cups 110 and 116 may be identical. As previously discussed, an insulative cup 116 prevents the top crimped portion of a lower adjacent battery from coming in electrical contact with an outer surface of the bottom of the canister of an upper adjacent battery cell when the lower adjacent and upper adjacent battery cells are serially coupled. When implemented, insulative cup 116 is located between the top crimped portion of a lower adjacent battery cell and the bottom of the canister of an upper adjacent battery cell.

Insulative cup 116 includes a rim 304 and a substantially planar portion 306. Planar portion 306 includes an opening 308 for receiving a recessed portion of a conductive weld cup. An inner surface 310 of rim 304 and planar portion 306 engage the side and the top crimped portion of the canister of a lower adjacent battery cell. An inwardly protruding rib 312 can be integrated into inner surface 310 of rim 304, if desired. When implemented, rib 312 defines an opening 314 for receiving a lower adjacent battery cell. An inner surface 316 of rib 312 engages the side of the canister of a battery cell in a beaded portion that results from the formation of a top crimped portion thereby retaining insulative cup 116 on a lower adjacent battery cell.

FIG. 3B is a top view of insulative cups 110 and 116. As discussed above, insulative cup 116 includes a receptacle 318 (shown in dotted lines) that is fashioned to receive an intermediate conductive strap 104 that can be coupled to integrated tab 206 of weld cup 114. As noted above, conductive strap 104 can be implemented without integrated tab 206 and would be coupled to ledge 204 of weld cup 114 and received in receptacle 318. Receptacle 318 allows the intermediate conductive strap to be positioned within the insulative cup 116 and further allows the conductive strap to maintain a planar configuration. Receptacle 318 also provides for increased air flow to accommodate battery cell venting. One of skill in the art will appreciate that insulative cup 116 can include more than one receptacle 318 to accept intermediate conductive straps coupled to multiple integrated tabs or weld cups. Insulative cup 110 is manufactured in a substantially similar manner except that insulative cup 110 does not necessarily include receptacle portion 318 that is fashioned to receive an intermediate conductive strap coupled to an integrated tab of a conductive weld cup.

FIG. 4A is a cross-sectional view of a conductive battery stick terminal end connector 106. Connector 106 includes a first solid portion 402 that has an edge surface 410 and a first and second face 406 and 408. First and second faces 406 and 408 are substantially planar and substantially orthogonal to edge surface 410. As shown, a central protrusion 404 protrudes from second face 408. Alternatively, second face 408 can be extended such that a central protrusion is not required. This allows a fabricator to retain connector 106 by edge surface 410 (by the portion that extends beyond end cup 108, rather than by central protrusion 404) during mechanical assembly of a battery stack. Central protrusion 404 includes a side surface 412 and a third face 414 that is substantially planar and substantially orthogonal to side surface 412. First face 406 and edge surface 410 engage an inner surface of a terminal end cup 108 (see FIGS. 5A–C). Preferably, edge surface 410 is tapered to facilitate the insertion of connector 106 into end cup 108. Preferably, first solid portion 402 and central protrusion 404 (if utilized) have a threaded bore for receiving a machine screw for retaining an end conductive strap. FIG. 4B is a top view of connector 106.

Figure 5A:
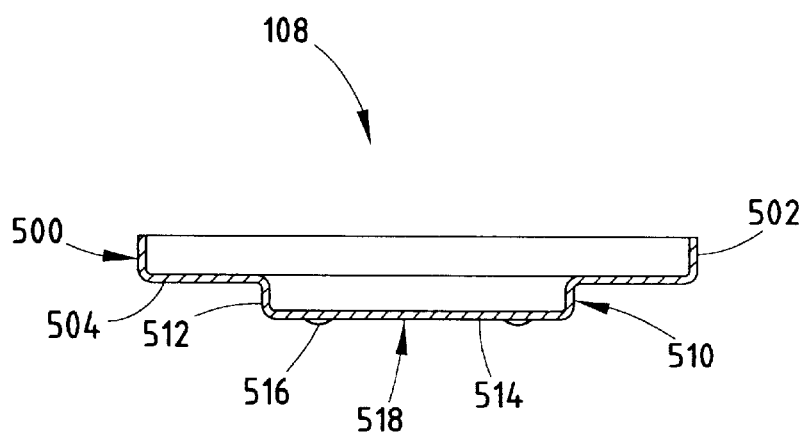
FIG. 5A is cross-sectional view of a conductive terminal end cup, according to an embodiment of the present invention.

FIG. 5A is cross-sectional view of a conductive terminal end cup 108. End cup 108 includes a bordered portion 500 and a recessed portion 510. Bordered portion 500 includes a first side wall 502 and a ledge 504 that is substantially planar. Ledge 504 is substantially orthogonal to first side wall 502. Recessed portion 510 is recessed within ledge 504. Recessed portion 510 includes a second side wall 512 and a floor 514 that is substantially planar and substantially orthogonal to second side wall 512. An outer surface 518 of floor 514 engages the cover of an upper end battery cell or the bottom of the canister of a lower end battery cell. As previously discussed, end cup 108 receives a connector 106 which is retained therein by a plurality of spot welds.

Figure 5B:
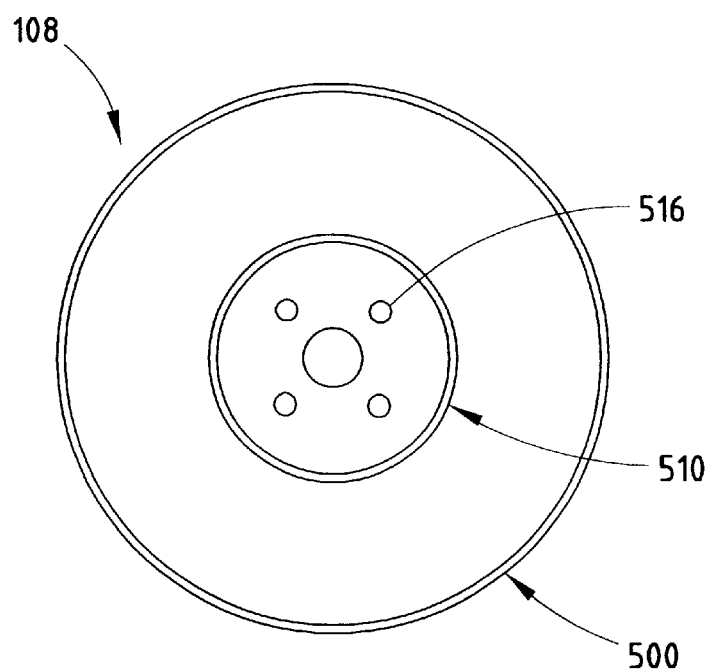
FIG. 5B is a bottom view of the cup of FIG. 5A.
Figure 5C:
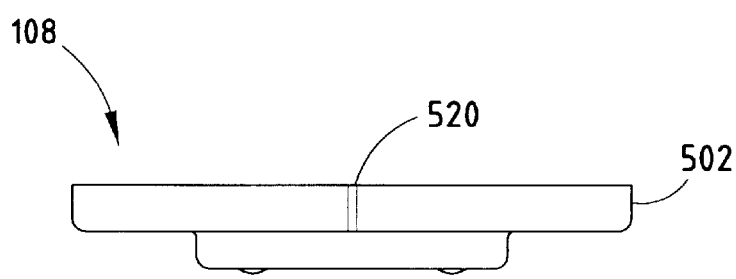
FIG. 5C is a side view of the conductive terminal end cup of FIG. 5A that includes a slot.

FIG. 5B is bottom view of end cup 108 showing a plurality of protrusions 516. FIG. 5C is a side view of end cup 108 including a slot 520. Another slot (not shown) of similar dimensions is preferably located opposite of slot 520. Slot 520 is shown completely bisecting first side wall 502. The width and depth of slot 520 can be varied to achieve a desired result. Slot 520 allows side wall 502 to flex and provide a tension force against edge 410 of connector 106 (see FIG. 4A). This helps to retain connector 106 within end cup 108 during assembly, before end cup 108 is spot welded to connector 106 and normally allows a better (lower resistance connection) weld to be achieved.

The above description is considered that of the preferred embodiments only. Modification of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

What is claimed is:

1. A connector assembly for connecting a plurality of battery cells in a serial/parallel arrangement, each battery cell including a cover and a canister having a side and a bottom, where a segment of the side of the canister forms a top crimped portion that retains the cover and is electrically isolated from the cover, the connector assembly comprising:
   a conductive weld cup, the conductive weld cup including:
      a bordered portion having a first side wall, a ledge and an integrated tab projecting from the first side wall, wherein the ledge and the integrated tab are disposed at an angle to the first side wall; and
      a recessed portion recessed within the bordered portion, wherein the recessed portion includes a second side wall and a floor that is disposed at an angle to the second side wall, where an inner surface of the bordered portion engages an outer surface of the side and the bottom of the canister of an upper adjacent battery cell and an outer surface of the floor engages the cover of a lower adjacent battery cell, and where the integrated tab is provided for coupling the battery cells of two adjacent battery sticks in parallel; and an insulative cup for preventing the top crimped portion of the lower adjacent battery cell from coming in electrical contact with the outer surface of the bottom of the canister of the upper adjacent battery cell when the lower adjacent and the upper adjacent battery cells are serially coupled, the insulative cup located between the top crimped portion of the lower adjacent battery cell canister and the bottom of the canister of the upper adjacent battery cell, the insulative cup including a substantially planar portion and a rim extending about the periphery of the planar portion, wherein the planar portion includes an opening for receiving the recessed portion of the conductive weld cup, and wherein an inner surface of the rim and the planar portion engage the side and the top crimped portion of the canister of the lower adjacent battery cell.

2. The connector assembly of claim 1, wherein the outer surface of the floor includes a plurality of protrusions for welding the weld cup to the cover of the lower adjacent battery cell.

3. The connector assembly of claim 1, wherein the first side wall includes a plurality of equally spaced slots for resiliently retaining the canister of the upper adjacent battery cell within the weld cup.

4. The connector assembly of claim 1, wherein the insulative cup further includes:

an inwardly protruding rib integrated into the inner surface of the rim, wherein the rib engages the side of the canister in a beaded portion that results from the formation of the top crimped portion thereby serving to retain the insulative cup on the lower adjacent battery cell.

5. An insulative cup for preventing a top crimped portion of a canister of a lower adjacent battery cell from coming in electrical contact with a bottom of a canister of an upper adjacent battery cell when the lower adjacent and the upper adjacent battery cells are serially coupled, the insulative cup located between the top crimped portion of the lower adjacent battery cell canister and the bottom of the canister of the upper adjacent battery cell, the insulative cup comprising:

a rimmed portion having a substantially planar portion and a rim extending about the periphery of the planar portion, wherein the planar portion includes an opening for receiving a conductive weld cup, and wherein an inner surface of the rim and the planar portion engage a side and the top crimped portion of the canister of the lower adjacent battery cell; and an inwardly protruding rib integrated into the inner surface of the rim, wherein the rib engages the side of the canister in a beaded portion that results from the formation of the top crimped portion thereby retaining the insulative cup on the lower adjacent battery cell.

6. The insulative cup of claim 5, wherein the planar portion is configured to accept an intermediate conductive strap that attaches to an integrated tab of the conductive weld cup.

7. A conductive weld cup for connecting a plurality of battery cells in a serial/parallel arrangement, each battery cell including a cover and a canister having a side and a bottom, where a segment of the side of the canister forms a top crimped portion that retains the cover and is electrically isolated from the cover, the conductive weld cup comprising:

a bordered portion having a first side wall, a ledge and an integrated tab projecting from the first side wall, wherein the ledge and the integrated tab are disposed at an angle to the first side wall; and a recessed portion recessed within the ledge, wherein the recessed portion includes a second side wall and a floor that is bounded by the second side wall, where an inner surface of the bordered portion engages an outer surface of the side and the bottom of the canister of an upper adjacent battery cell and an outer surface of the floor engages a top surface of the cover of a lower adjacent battery cell, and where the integrated tab is provided for coupling the battery cells of two battery sticks in parallel.

8. The conductive weld cup of claim 7, wherein the outer surface of the floor includes a plurality of protrusions for welding the weld cup to the cover of the lower adjacent battery cell.

9. The conductive weld cup of claim 7, where in the first side w all includes a plurality of equally spaced slots for resiliently retaining the canister of the upper adjacent battery cell within the weld cup.

10. A battery stick terminal end connector assembly for connecting a plurality of battery sticks in a serial/parallel arrangement, each of the battery sticks including a plurality of battery cells, each of the battery cells including a cover and a canister having a side and a bottom, where a segment of the side of the canister forms a top crimped portion that retains the cover and is electrically isolated from the cover, the battery stick end connector assembly comprising:

a plurality of terminal end cups, each including:
a bordered portion having, a first side wall and a ledge that is bordered by the first side wall; and
a recessed portion recessed within the ledge, wherein the recessed portion includes a second side wall and a floor that is surrounded by the second side wall,
where an outer surface of the floor engages the cover of an upper end battery cell or the bottom of the canister of a lower end battery cell;

a plurality of conductive battery stick terminal end connectors, each including:
a solid portion having an edge surface, a first face and a second face, wherein the first and second faces are substantially planar and are joined about their perimeter by the edge surface; and
a central protrusion protruding from the second face, wherein the central protrusion includes a side surface and a third face that is substantially planar and substantially orthogonal to the side surface,
where the first face and the edge surface engage an inner surface of the bordered portion of one of the terminal end cups, and where the central protrusion has a threaded bore for receiving a machine screw for retaining an end conductive strap; and an insulative cup for preventing the cover of the upper end battery cell from coming in electrical contact with the canister of the upper end battery cell when the terminal end cup is coupled to the cover of the upper end battery cell, the insulative cup including a rim and a substantially planar portion, wherein the planar portion includes an opening for receiving the recessed portion of the terminal end cup, and wherein an inner surface of the rim and the planar portion engage the side and the top crimped portion of the canister of the upper end battery cell.

11. The connector assembly of claim 10, wherein the outer surface of the floor includes a plurality of protrusions for welding the terminal end cup to the cover of the upper end battery cell or the bottom of the canister of the lower end battery cell.

12. The connector assembly of claim 10, wherein the first side wall includes a plurality of equally spaced slots for resiliently retaining the terminal end connector within the terminal end cup.

13. The connector assembly of claim 10, wherein the insulative cup further includes:
an inwardly protruding rib integrated into an inner surface of the rim, wherein the rib engages the side of the canister in an beaded portion that results from the formation of the top crimped portion thereby retaining the insulative cup on the upper end battery cell.

14. A battery stick connector assembly for connecting a plurality of battery sticks and a plurality of battery cells in a serial/parallel arrangement, each of the battery sticks including a number of the battery cells, each of the battery cells including a cover and a canister having a side and a bottom, where a segment of the side of the canister forms a top crimped portion that retains the cover and is electrically isolated from the cover, the battery stick connector assembly comprising:
a plurality of conductive weld cups, each including:
a first bordered portion having a first side wall, a first ledge, and an integrated tab projecting from the first side wall, wherein the ledge and the integrated tab form an angle with the first side wall; and
a first recessed portion recessed within the first bordered portion, wherein the first recessed portion includes a second side wall and a first floor bounded by the second side wall,
where an inner surface of the first bordered portion engages an outer surface of the side and the bottom of the canister of an upper adjacent battery cell and an outer surface of the first floor engages the cover of a lower adjacent battery cell, and where the integrated tab is provided for coupling the battery cells of two adjacent battery sticks in parallel;
a plurality of first insulative cups for preventing the top crimped portion of a lower adjacent battery cell from coming in electrical contact with the bottom of the canister of an upper adjacent battery cell when the lower and the upper adjacent battery cells are serially coupled, the first insulative cups located between the top crimped portion of the lower adjacent battery cell canister and the bottom of the canister of the upper adjacent battery cell, each of the first insulative cups including:
a first rimmed portion having a first substantially planar portion and a first rim extending about the periphery of first planar portion, wherein the first substantially planar portion includes an opening for receiving the first recessed portion of a weld cup and is configured to accept an intermediate conductive strap that attaches to the integrated tab, and wherein an inner surface of the first rim and the first substantially planar portion engage the side and the top crimped portion of the canister of a lower adjacent battery cell;
a plurality of conductive terminal end cups, each including:

a second bordered portion having a third side wall and a second ledge that is bordered by the third side wall; and
a second recessed portion recessed within the second bordered portion, wherein the second recessed portion includes a fourth side wall and a second floor that is bounded by the fourth side wall,
where an outer surface of the second floor engages the cover of an upper end battery cell or the bottom of a canister of a lower end battery cell of one of the battery sticks;
a plurality of conductive battery stick terminal end connectors, each of the terminal end connectors including:
a solid portion having an edge surface, a first face and a second face, wherein the first and second faces are joined about their perimeter by the edge surface; and
a central protrusion protruding from the second face, wherein the central protrusion includes a side surface and a third face that is substantially planar and is substantially orthogonal to the side surface,
where the first face and the edge surface engage an inner surface of the second ledge and the third side wall of one of the terminal end cups, and where one of the solid portion and the central protrusion have a threaded bore for receiving a machine screw for retaining an end conductive strap; and
a second insulative cup for preventing the cover of the upper end battery cell from coming in electrical contact with the canister of the upper end battery cell when a terminal end cup is coupled to the cover of the upper end battery cell, the second insulative cup including:
a second rimmed portion having a second substantially planar portion and a second rim extending about the periphery of the second substantially planar portion, wherein the second substantially planar portion includes an opening for receiving the second recessed portion of a terminal end cup, and wherein an inner surface of the second rim and the second substantially planar portion engage the side and the top crimped portion of the canister of the upper end battery cell.

15. The connector assembly of claim 14, wherein the outer surface of the second floor includes a plurality of protrusions for welding the terminal end cup to the cover of the upper end battery cell or the bottom of the canister of the lower end battery cell, and wherein the outer surface of the first floor includes a plurality of protrusions for welding the conductive weld cup to the cover of a lower adjacent battery cell.

16. The connector assembly of claim 14, wherein the first side wall includes a plurality of equally spaced slots for resiliently retaining the upper adjacent battery cell within the conductive weld cup, and wherein the third side wall includes a plurality of equally spaced slots for resiliently retaining the terminal end connector within the terminal end cup.

17. The battery stick connector assembly of claim 14, wherein each of the first insulative cups further includes a first inwardly protruding rib integrated into an inner surface of the first rim, where the first inwardly protruding rib includes an opening for receiving a lower adjacent battery cell, and where an inner surface of the first inwardly protruding rib engages the side of the canister in a beaded portion that results from the formation of the top crimped portion thereby retaining the insulative cup on the lower adjacent battery cell, and wherein the second insulative cup further includes a second inwardly protruding rib integrated into an inner surface of the second rim, where the second inwardly protruding rib includes an opening for receiving the upper end battery cell, and where an inner surface of the second inwardly protruding rib engages the side of the canister in a beaded portion that results from the formation of the top crimped portion thereby serving to retain the insulative cup on the upper end battery cell.

18. A battery stick terminal end assembly for connecting a plurality of battery sticks in a serial/parallel arrangement, each of the battery sticks including a plurality of battery cells, each of the battery cells including a cover and a canister having a side and a bottom, where a segment of the side of the canister forms a top crimped portion that retains the cover and is electrically isolated from the cover, the battery stick end connector assembly comprising:

a plurality of conductive terminal end cups, each including:
   a bordered portion having a first side wall and a ledge that is bordered by the first side wall,
   where an outer surface of the terminal end cup engages the cover of an upper end battery cell or the bottom of the canister of a lower end battery cell;

a plurality of conductive battery stick terminal end connectors, each including:
   a solid portion having an edge surface, a first face and a second face, wherein the first and second faces are substantially planar and are joined about their perimeter by the edge surface,
   where the first face and the edge surface engage an inner surface of the ledge and the first side wall of one of the terminal end cups, and where the solid portion has a threaded bore for receiving a machine screw for retaining an end conductive strap.

19. The terminal end assembly of claim 18, wherein the outer surface of the floor includes a plurality of protrusions for welding the terminal end cup to the cover of the upper end battery cell or the bottom of the canister of the lower end battery cell.

20. The terminal end assembly of claim 18, wherein the first side wall includes a plurality of equally spaced slots for resiliently retaining the terminal end connector within the terminal end cup.

21. The terminal end assembly of claim 18, further including:
   a recessed portion recessed within the bordered portion, wherein the recessed portion includes a second side wall and a floor that is surrounded by the second side wall, and wherein an outer surface of the floor engages the cover of an upper end battery cell or the bottom of the canister of a lower end battery cell.

22. The terminal end assembly of claim 18, further including:
   a central protrusion protruding from the second face, wherein the central protrusion includes a side surface and a third face that is substantially planar and substantially orthogonal to the side surface, and wherein the central protrusion has a threaded bore for receiving a machine screw for retaining an end conductive strap.

23. A battery stick terminal end connector assembly for connecting a plurality of battery sticks in a serial/parallel arrangement, each of the battery sticks including a plurality of battery cells, each of the battery cells including a cover and a canister having a side and a bottom, where a segment of the side of the canister forms a top crimped portion that retains the cover and is electrically isolated from the cover, the battery stick end connector assembly comprising:

a first conductive terminal end cup, including:
   a first bordered portion having a first side wall and a first ledge that is disposed at an angle to the first side wall; and
   a recessed portion recessed within the first bordered portion, wherein the recessed portion includes a second side wall and a floor that is bounded by the second side wall,
   where an outer surface of the floor engages the cover of an upper end battery cell;

a second conductive terminal end cup, including:
   a second bordered portion having a third side wall and a second ledge that is disposed at an angle to the third side wall,
   where an outer surface of the second ledge engages the bottom of the canister of a lower end battery cell;

first and second conductive battery stick terminal end connectors, each including:
   a solid portion having an edge surface, a first face and a second face, wherein the first and second faces are substantially planar and are joined about their periphery by the edge surface,
   where the first face and the edge surface of the first and second terminal end connectors respectively engage an inner surface of the first and second bordered portions of the first and second conductive terminal end cups, and where the first and second terminal end connectors each have a threaded bore for receiving a machine screw for retaining an end conductive strap; and an insulative cup for preventing the cover of the upper end battery cell from coming in electrical contact with the canister of the upper end battery cell when the first terminal end cup is coupled to the cover of the upper end battery cell, the insulative cup including a rim and a substantially planar portion surrounded by the rim, wherein the planar portion includes an opening for receiving the recessed portion of the first terminal end cup, and wherein an inner surface of the rim and the planar portion engage the side and the top crimped portion of the canister of the upper end battery cell.

24. The connector assembly of claim 23, wherein the outer surface of the floor includes a plurality of protrusions for welding the first terminal end cup to the cover of the upper end battery cell, and wherein the outer surface of the second ledge includes a plurality of protrusions for welding the second terminal end cup to the bottom of the canister of the lower end battery cell.

25. The connector assembly of claim 23, wherein the first and third side walls includes a plurality of equally spaced slots for resiliently retaining the terminal end connector within the first and second conductive terminal end cups.

26. The connector assembly of claim 23, wherein the insulative cup further includes:
   an inwardly protruding rib integrated into an inner surface of the rim, wherein the rib engages the side of the canister in a beaded portion that results from the formation of the top crimped portion thereby retaining the insulative cup on the upper end battery cell.

27. The battery stick terminal end connector assembly of claim 23, wherein the plurality of conductive battery stick terminal end connectors, further include:
   a central protrusion protruding from the second face, wherein the central protrusion includes a side surface and a third face that is substantially planar and substantially orthogonal to the side surface,
   where the first face and the edge surface engage an inner surface of the first and second bordered portions of the first and second conductive terminal end cups, and where the central protrusion has a threaded bore for receiving a machine screw for retaining an end conductive strap.

* * * * *